United States Patent
Lai et al.

(10) Patent No.: US 7,217,403 B2
(45) Date of Patent: May 15, 2007

(54) METHOD FOR SYNTHESIZING ALUMINUM NITRIDE

(75) Inventors: Chen-Hsin Lai, Tainan (TW); Tzyy-Bin Werng, Tainan Hsien (TW)

(73) Assignee: Taiyen Biotech. Co. Ltd., Tainan (TW)

( * ) Notice: Subject to any disclaimer, the term of this patent is extended or adjusted under 35 U.S.C. 154(b) by 41 days.

(21) Appl. No.: 11/166,302

(22) Filed: Jun. 24, 2005

(65) Prior Publication Data
US 2006/0115406 A1 Jun. 1, 2006

(30) Foreign Application Priority Data
Dec. 1, 2004 (TW) .............................. 93137075 A

(51) Int. Cl.
*C01B 21/072* (2006.01)
(52) U.S. Cl. ........................................ 423/412
(58) Field of Classification Search ................. 423/412
See application file for complete search history.

(56) References Cited

U.S. PATENT DOCUMENTS

| | | | |
|---|---|---|---|
| 5,453,407 A * | 9/1995 | Chung et al. | 501/96.1 |
| 5,649,278 A | 7/1997 | Dunmead et al. | |
| 6,423,287 B1 * | 7/2002 | Chung et al. | 423/412 |
| 7,011,804 B2 * | 3/2006 | Lau et al. | 423/412 |
| 2003/0185740 A1 * | 10/2003 | Chung et al. | 423/412 |

FOREIGN PATENT DOCUMENTS

JP 64-76905 * 3/1989 ................. 423/412

OTHER PUBLICATIONS

Masahiro Uda, Kastuhisa Ohsaki, and Yoshikasu Morita; "Preparation of Mixed Ultrafine (AL=ALN) Powders and Their Nitridation;" Oct. 1989; pp. 261-269.
R.C. Dalton, I. Ahmad, and D.E. Clark; "Combustion Synthesis Using Microwave Energy;" Ceram. Eng. Sci. Proc. 11[9-10]; 1990; pp. 1729-1742, no month.
George Long and L.M. Foster; "Aluminum Nitride, a Refractory for Aluminum to 2000° C.;" Journal of the America Ceramic Society; Feb. 1959; pp. 53-59.

* cited by examiner

*Primary Examiner*—Wayne A. Langel
(74) *Attorney, Agent, or Firm*—Thomas, Kayden, Horstemeyer & Risley

(57) ABSTRACT

A method for synthesizing aluminum nitride is disclosed, wherein an ignition agent is formed by mixing an azide powder (such as sodium azide; $NaN_3$) and aluminum powder, and is paved on an ignition portion of a reactant-containing body having a plurality of ratios of aluminum to a diluent, wherein the content of the diluent is gradually increased in accordance with the propagation direction of combustion wave generated in the combustion synthesis process. The method for synthesizing aluminum nitride is to ignite the ignition agent located in the ignition portion of the reactant-containing body under an ambience in which the pressure is less than 1 atm, and to introduce nitrogen gas as the nitrogen source into the reaction chamber after ignition.

20 Claims, 3 Drawing Sheets

METHOD FOR SYNTHESIZING ALUMINUM NITRIDE

RELATED APPLICATIONS

The present application is based on, and claims priority from, Taiwan Application Serial Number 93137075, filed Dec. 1, 2004, the disclosure of which is hereby incorporated by reference herein in its entirety.

FIELD OF THE INVENTION

The present invention relates to a method for synthesizing aluminum nitride, and more particularly, to a combustion synthesis method for preparing aluminum nitride by igniting reactants under an ambience in which the pressure is less than 1 atmosphere (atm).

BACKGROUND OF THE INVENTION

Recently, aluminum nitride (AlN) has become a very important material in industrial applications due to its unique physical properties, such as high thermal conductivity close to that of metals and more than 10 times as much as that of alumina, high electrical resistivity and low thermal expansion coefficient comparable to silicon and silicon carbide; a high electrical resistivity; good thermal-shock resistance; mechanical strength comparable to alumina ceramics; and good corrosion resistance. Aluminum nitride has been popularly considered for use in many commercial applications, such as substrates for electronic components; integrated circuit packaging materials; heat dissipation materials; and vessels for containing or processing molten metals and salts.

Aluminum nitride are generally manufactured via the method of, carbothermally reducing and nitriding alumina; directly reacting aluminum metal with nitrogen; reacting aluminum chloride and ammonia in a vapor phase; and self-propagating high temperature synthesis (SHS), i.e. combustion synthesis. The first three methods mentioned above and their modified processes all have the common drawbacks of taking relatively much time; consuming relatively much energy; having relatively low conversion rate, etc. In comparison with those methods, the method of combustion synthesis is newly developed to produce aluminum nitride, and has the advantages including fast reaction rate; less energy consumption; simple manufacturing steps suitable for use in mass production; and higher conversion rate. The method of combustion synthesis basically uses a spontaneous chemical reaction initiated by igniting and rapidly propagating a combustion wave through a reactant admixture to produce aluminum nitride.

Several prior arts for preparing aluminum nitride by the combustion synthesis method are described hereinafter:

(1) U.S. Pat. No. 5,649,278 disclosed a method for preparing aluminum nitride by igniting a particulate material composed of aluminum or aluminum alloy in the presence of gaseous nitrogen at a pressure of from 0.75 to 30 atmospheres, wherein the diluent being present in an amount of from 20 to 80 percent by weight is added to the particulate material, and at least 75 percent by weight (% wt) of the aluminum in the particulate material is converted to aluminum nitride.

(2) Uda et al. ("Preparation of Mixed Ultrafine (Al+AlN) Powders and Their Nitridation", Physical Chemistry of Powder Metals Production and Processing, The Minerals, Metals & Materials Society, 1989.) disclosed the preparation of AlN sintered compacts using a simple furnace, wherein the compact of mixed ultra-fine (Al+AlN) powder is placed in a cold furnace and heated in a nitrogen atmosphere. When the temperature reached about 870 K, the combustion of the compact accompanied by an intense emission of light occurs, and the temperature of the compact rises from about 870 K to about 1700 K in a few seconds, thereby obtaining a hard and porous sintered compact of AlN.

(3) Clark et al. ("Combustion Synthesis Using Microwave Energy", Ceram. Eng. Sci Proc. 11[9–10], pp. 1729–1742, 1990.) disclosed a combustion synthesis process of pouring Al powder into a fused silica crucible; then placing the crucible in a microwave for 5 minutes with consistent nitrogen gas, so as to purge the air; and thereafter actuating microwave source to initiate SHS.

(4) In the paper of Long et al. ("Aluminum Nitride, a Refractory for Aluminum for 2000° C.", Journal of American Ceramic Society, Vol. 42, No. 2, pp53–59, Feb. 1, 1959), it is stated that Mellor ("Comprehensive Treatise On Inorganic and Theoretical Chemistry", Vol. VIII, Nitrogen and Phosphorus. Longmans, Green and Co., New York, 1928.) reported that Brieglib and Geuther, in 1862, produced aluminum nitride by heating aluminum turnings in an atmosphere of nitrogen, wherein the reaction proceeds to about 700° C. Mellor also reports that Zengheis disclosed the formation of aluminum nitride, wherein aluminum was burned in oxygen, and nitrogen is substituted with oxygen while the metal was still burning.

The conventional combustion synthesis methods for preparing aluminum nitride can be roughly divided in two categories: forming a compact by molding the reactant admixture; and filling the reactants into a refractory container, such as a graphite or ceramic crucible, wherein the former needs to preprocess the reactant admixture into a compact before reaction, resulting in higher operation cost and complicated operation steps, and the latter has difficulty in achieving the preparation of aluminum nitride of good quality and production. Moreover, the conventional technologies are disadvantageous in difficult ignition, being susceptible to oxygen and moisture contamination in atmosphere, thus lowering the quality of aluminum nitride produced.

Hence, there is an urgent need to develop a method for synthesizing aluminum nitride for simplifying operation steps; lowering operation cost; easily igniting reactants; avoiding oxygen and moisture contamination in atmosphere; and improving the quality and yield of aluminum nitride produced.

SUMMARY OF THE INVENTION

In view of the invention background described above, The conventional combustion synthesis methods for preparing aluminum nitride has the shortcomings of complicated operation steps, high operation cost, difficulty of igniting, oxygen and moisture contamination in atmosphere, and poor quality and yield of aluminum nitride produced.

Therefore, it is an aspect of the present invention to provide a method for synthesizing aluminum nitride, thereby providing an aluminum nitride combustion synthesis reaction of brief operation steps, low operation cost, easy ignition, minimum oxygen and moisture contamination is atmosphere, and good quality and yield of aluminum nitride.

In accordance with the aforementioned aspect, the present invention provides a method for synthesizing aluminum nitride. At first, a reactant-containing body is prepared, wherein the reactant-containing body is composed of aluminum powder or an admixture of aluminum powder and a diluent, and there is an ignition zone located on one end of the reactant-containing body. Then, an igniting agent is prepared, wherein the igniting agent is composed of an azide powder (such as $NaN_3$) or an admixture of aluminum powder and the azide powder. Thereafter, the igniting agent is paved on the igniting zone of the reactant-containing body. Then, the reactant-containing body is placed in a reaction chamber. After the reaction chamber is vacuumed, nitrogen gas is introduced into the reaction chamber so as to increase the pressure in the reaction chamber to a first predetermined pressure, wherein the first predetermined pressure is ranged between about 0.3 atm and about 0.75 atm. Thereafter, the igniting agent in the ignition zone is ignited. After ignition, nitrogen gas is further introduced into the reaction chamber so as to increase the pressure in the reaction chamber to a second predetermined pressure for performing a combustion synthesis process to produce the aluminum nitride, wherein the second predetermined pressure is ranged between about 0.75 atm and about 10 atm. After the combustion synthesis process is done, the pressure of the reaction chamber is first released to about 1 atm, and then nitrogen gas is introduced again to increase the pressure of the reaction chamber to a third predetermined pressure, and thereafter a cooling process is performed, wherein the third predetermined pressure is ranged between about 3 atm and about 10 atm.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention is featured in providing an igniting agent made of an admixture of $NaN_3$ and aluminum powder to work with a reactant-containing body having a plurality of different weight ratios of aluminum powder to a diluent, wherein the content of the diluent is gradually increasing along the propagation direction of combustion wave occurring in a combustion synthesis process for lowering the reaction temperature, thereby minimizing the coalescence of molten aluminum powder, thus improving product yield and quality of aluminum nitride. The present invention is further featured in igniting the igniting agent located in an ignition zone of the reactant-containing body under ambience in which the pressure is less than 1 atmosphere (atm); and in introducing nitrogen gas into a reaction chamber as nitrogen source for greatly lowering production cost.

Figure 1:
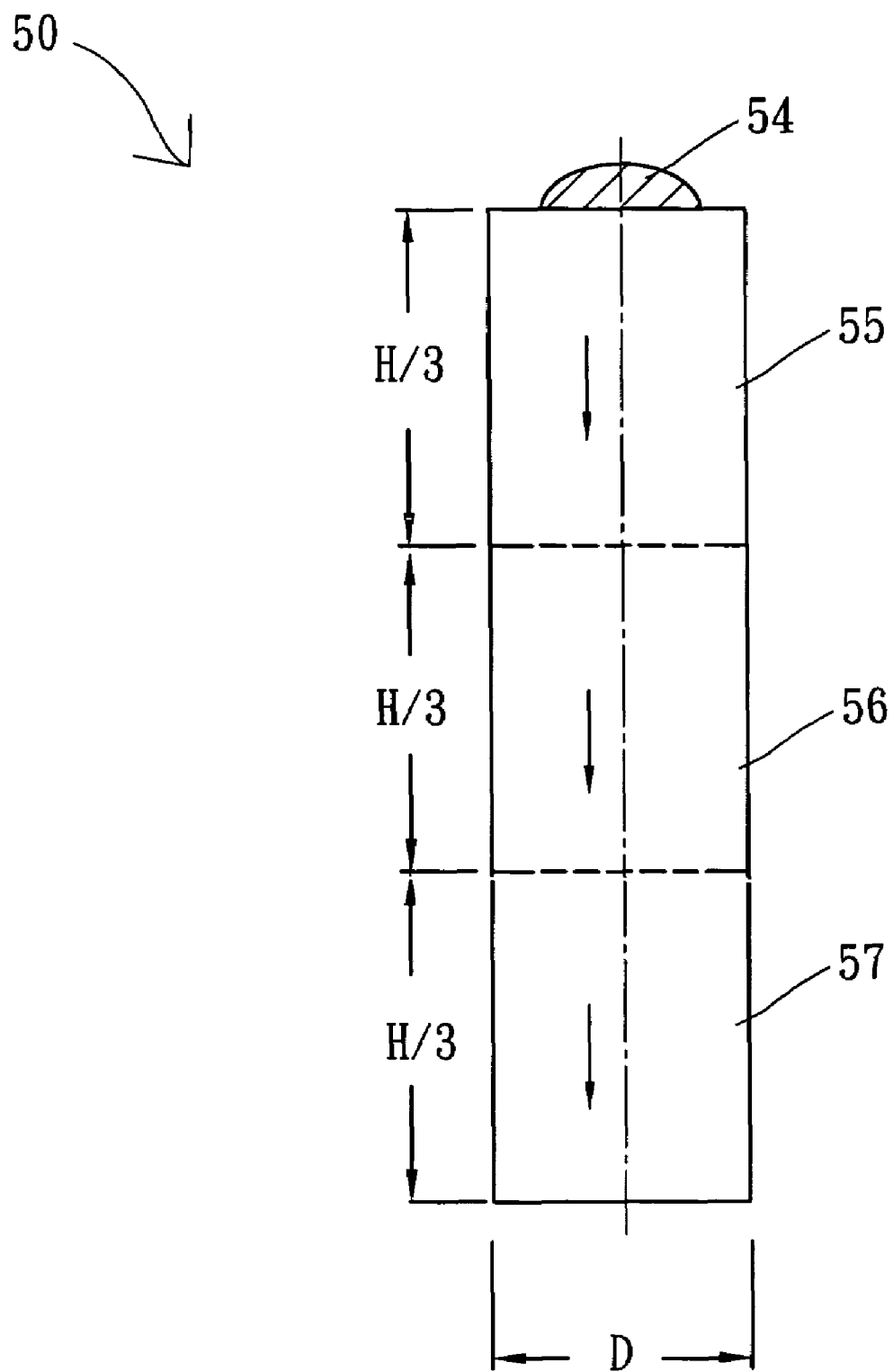
FIG. 1 is a schematic side-view showing the direction of combustion wave propagating in a reactant-containing body while preparing aluminum nitride, wherein the height (H) of the reactant-containing body is greater than about twice as much as the diameter (D) of the reactant-containing body, i.e. H>2D.
Figure 2A:
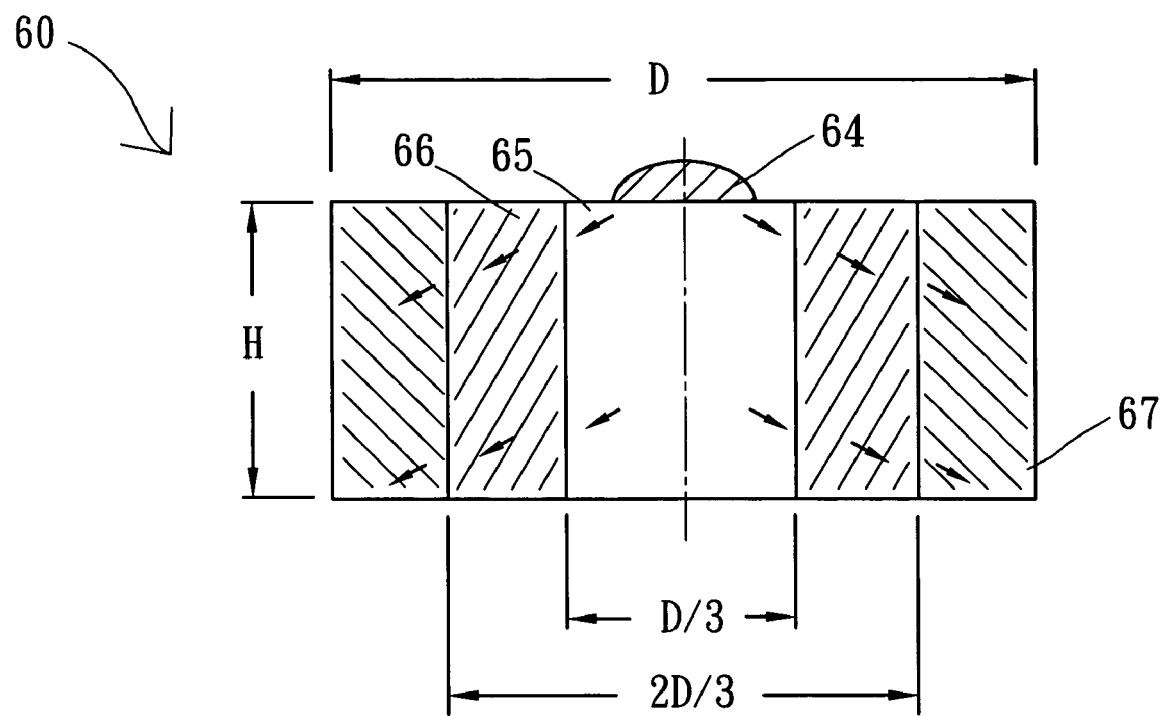
FIG. 2A and FIG. 2B are schematic side and top views showing the direction of combustion wave propagating in a reactant-containing body while preparing aluminum nitride, wherein the diameter (D) of the reactant-containing body is greater than about one and a half times as much as the height (H) of the reactant-containing body, i.e. D>3/2H.
Figure 2B:
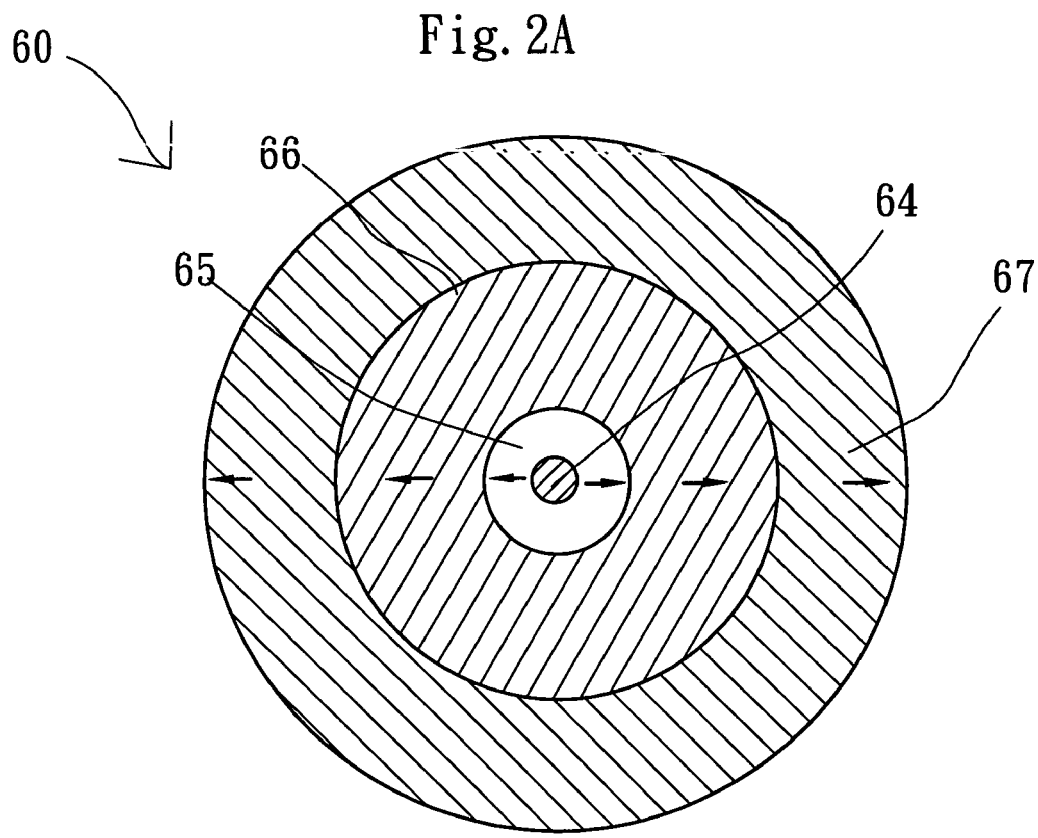

Referring to FIG. 1, FIG. 1 is a schematic side-view showing the direction of combustion wave propagating in a reactant-containing body while preparing aluminum nitride, wherein the height (H) of the reactant-containing body 50 is greater than about twice as much as the diameter (D) of the reactant-containing body, i.e. H>2D. Such as shown in FIG. 1, once an ignition zone 54 located on the topmost of the reactant-containing body 50 is ignited, the combustion wave propagates basically along the 1-D direction from the top of the reactant-containing body 50 to the bottom thereof, which are a propagating zone 55, a sustaining zone 56 and an ending zone 57 respectively corresponding to the stages of the combustion synthesis process as developed, each of the propagating zone 55, the sustaining zone 56 and the ending zone 57 occupying vertically about ⅓ of the reactant-containing body 50. Referring to FIG. 2A and FIG. 2B, FIG. 2A and FIG. 2B are schematic side and top views showing the direction of combustion wave propagating in a reactant-containing body 60 while preparing aluminum nitride, wherein the diameter (D) of the reactant-containing body is greater than about twice as much as the height (H) of the reactant-containing body, i.e. D>3/2H. Such as shown in FIG. 2A and FIG. 2B, once an ignition zone 64 located on the topmost of the reactant-containing body 60 is ignited, the combustion wave propagates basically along the 1-D direction from the central part of the reactant-containing body to the outer part thereof, which are a propagating zone 65, a sustaining zone 66 and an ending zone 67 distributed horizontally, each of the propagating zone 65, the sustaining zone 66 and the ending zone 67 occupying horizontally about ⅓ of the reactant-containing body 60.

For easy ignition, the present invention places an igniting agent made of an admixture of an azide power and aluminum powder on the ignition zone, wherein with more azide powder contained in the ignition agent, the reactant containing body is more easily to be ignited, so that the content of the azide powder in the ignition agent is preferably greater than or equal to about 0.4 wt %, and the azide powder can be such as sodium nitride ($NaN_3$) powder, potassium nitride ($KN_3$), barium nitride ($Ba_3 N_2$) or any mixture thereof. Further, the specification of the aluminum powder used as the igniting agent is different from that filled in the reactant-containing body, and the bulk density of the aluminum powder in the igniting agent is ranged between about 0.3 $g/cm^3$ and about 0.5 $g/cm^3$, and less than abut 8% of the aforementioned aluminum powder is about 150 mesh of particle size.

For promoting the efficiency of combustion synthesis process, the admixture of various weight ratios of aluminum powder to the diluent are respectively filled along the propagation direction of the combustion wave, i.e. from the propagating zone through the sustaining zone to the ending zone, wherein the diluent can be AlN, $Al_2O_3$, BN, $Si_3N_4$, TiN, SiC, $ZrO_2$, $TiO_2$, $SiO_2$ or any mixture thereof. For properly controlling the reaction temperature, the longer the combustion synthesis process goes, the more diluent (smaller weight ratio of aluminum powder to the diluent) needs. For example, the weight ratio of aluminum powder to the diluent (aluminum nitride powder) filled in the propagating zone is between about 6:1 to about 12:1; the weight ratio of aluminum powder to the diluent (aluminum nitride powder) filled in the sustaining zone is between about 2:1 to about 6:1; and the weight ratio of aluminum powder to the diluent (aluminum nitride powder) filled in the ending zone is between about 1:1 to about 4:1.

Moreover, if the height (H) of the reactant-containing body is between half of the diameter (D) thereof and one and a half times of the diameter thereof, i.e. $3/2D \leqq H \leqq 2D$, then the reactant-containing body can be divided into an ignition zone, an upper layer, an middle layer and a lower layer. Each of the upper layer, the middle layer and the lower layer has a propagating zone, a sustaining zone and an ending zone. Just as described above, the weight ratio of aluminum powder to the diluent filled in the propagating zone of the upper layer is lowered than that filled in the ignition zone, and the weight ratios of aluminum powder to the diluent filled in the propagating zone of the middle layer and the lower layer are decreased sequentially, i.e. the weight ratio of aluminum powder to the diluent filled in the propagating zone of the middle layer is smaller than that filled in the propagating zone of the upper layer; the one filled in the propagating zone of the lower layer is smaller than that in the propagating zone of the middle layer. Then, for each of the upper layer, the middle layer and the lower layer, the weight ratios of aluminum powder to the diluent filled in the propagating zone, the sustaining zone and the ending zone are decreased sequentially, i.e. the ratio filled in the sustaining zone is smaller than that filled in the propagating zone; and the ratio filled in the ending zone is smaller that filled in the sustaining zone.

For practicing the case shown in FIG. 1, merely a hollow housing is needed for filling different ratios of aluminum powder to a diluent. However, for practicing the case shown in FIG. 2A and FIG. 2B, a multi-layered structure has be first placed into a hollow housing for filling the admixtures of various ratios of aluminum powder to the diluent.

Figure 3:
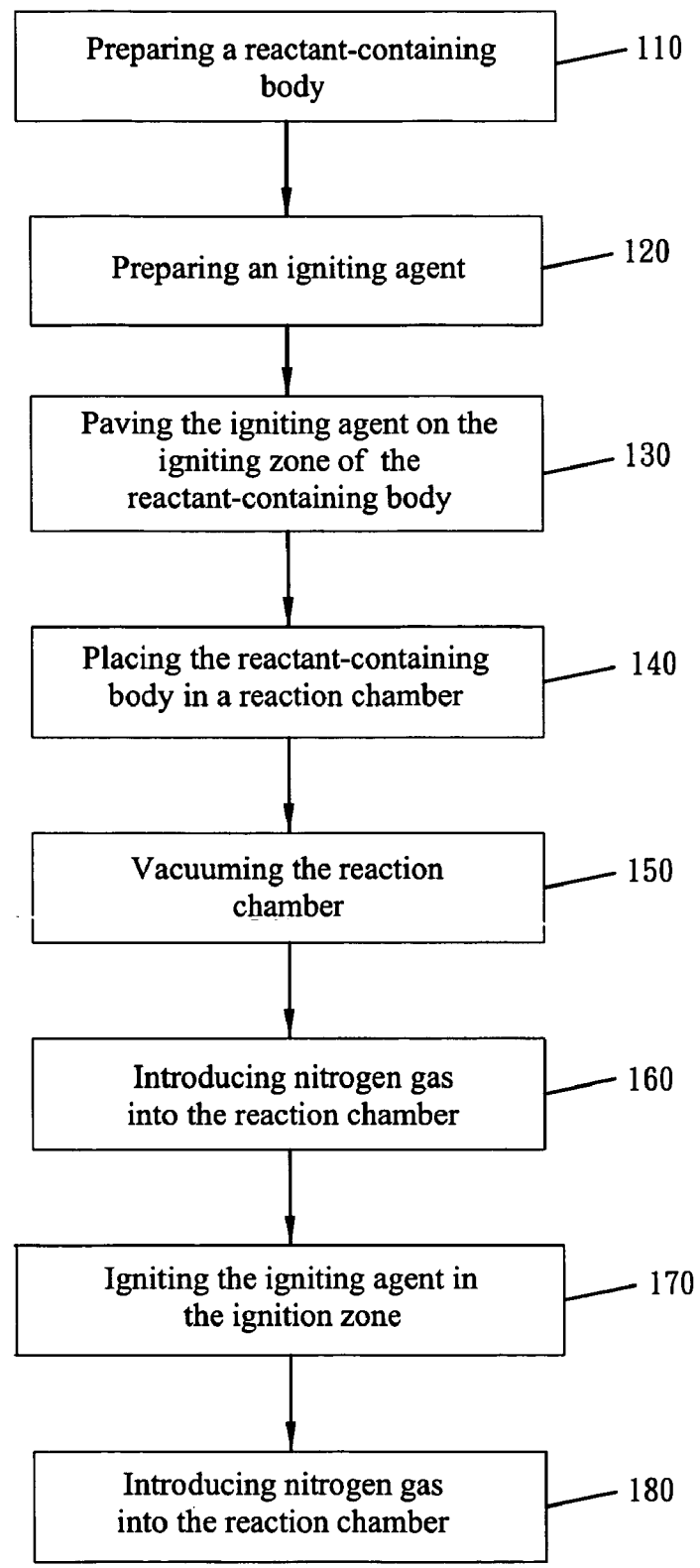
FIG. 3 is a schematic flow chart showing the method for synthesizing aluminum nitride according to a preferred embodiment of the present invention.

Referring to FIG. 3, FIG. 3 is a schematic flow chart showing the method for synthesizing aluminum nitride according to a preferred embodiment of the present invention. At first, step 110 is performed to prepare a reactant-containing body in accordance with the aforementioned method, wherein the reactant-containing body is composed of aluminum powder or an admixture of aluminum powder and a diluent, and there is an ignition zone located on one end (such as a top end) of the reactant-containing body. Then, step 120 is performed to prepare an igniting agent, wherein the igniting agent is composed of an azide powder (such as $NaN_3$) or an admixture of aluminum powder and the azide powder. Thereafter, step 130 is performed to pave the igniting agent on the igniting zone of the reactant-containing body. Then, step 140 is performed to place the reactant-containing body in a reaction chamber. After the reaction chamber is vacuumed (step 150), step 160 is performed to introduce nitrogen gas into the reaction chamber so as to increase the pressure in the reaction chamber to a first predetermined pressure, wherein the first predetermined pressure is ranged between about 0.3 atm and about 0.75 atm. Steps 150 and 160 are used to prevent the subsequent combustion synthesis from being contaminated by oxygen gas in the atmosphere. Thereafter, step 170 is performed to ignite the igniting agent in the ignition zone. After ignition, step 180 is performed to further introduce nitrogen gas into the reaction chamber so as to increase the pressure in the reaction chamber to a second predetermined pressure for continuously performing a combustion synthesis process to produce the aluminum nitride, wherein the second predetermined pressure is ranged between about 0.75 atm and about 10 atm. After the combustion synthesis process is done, the present invention may further release the pressure of the reaction chamber to about 1 atm first for further removing the moisture remained in the reaction chamber, and then introduce nitrogen gas again to increase the pressure of the reaction chamber to a third predetermined pressure, and thereafter a cooling process is performed, thereby preventing the moisture from reacting with aluminum oxide during the cooling process, wherein the third predetermined pressure is ranged between about 3 atm and about 10 atm.

Hereinafter, the present invention will be explained with the following examples, which are merely stated as examples for explanation and do not limit the scoped of the present invention.

Examples 1–4 utilizes a small graphite hollow housing installed on a small graphite crucible; example 6 utilizes a medium graphite housing installed on a medium graphite crucible; and example 7 utilizes a large graphite housing installed on a large graphite crucible. The small graphite crucible is a cylinder of 12 cm in diameter and 30 cm in height; the medium graphite crucible is a cylinder of 36 cm in diameter and 30 cm in height; and the large graphite crucible is a cylinder of 54 cm in diameter and 30 cm in height. In all the examples, aluminum nitride is used as a diluent, and the base of each of the graphite crucible has a plurality of holes for introducing nitrogen gas through the reactant containing body.

EXAMPLE 1

The admixture of aluminum: aluminum nitride=4:1 is filled in the small graphite housing to form a reactant-containing body, and the total mass of the admixture is 1.060 kg with the bulk density of $0.34\ g/cm^3$. Then, pure aluminum powder of the bulk density of $0.38\ g/cm^3$ and 4.0% $NaN_3$ by weight are evenly mixed as an igniting agent, and the igniting agent of 3 mm in thickness and about 50 mm in diameter is placed on the center of the top of the reactant-containing body. After the reactant-containing body is ready, the reactant-containing body is placed a reaction chamber. Then, about 1 atm nitrogen gas is introduced into the reaction chamber, and the coolant (water) starts re-circulating between an inner wall and an outer wall of the reaction chamber, wherein the temperature of the coolant is kept at about room temperature. Thereafter, electric current of 30 to 40 Amperes and 50 to 60 Volts is applied to a tungsten filament (ignition device) for about 5 to 10 seconds. As soon as the igniting agent on the top of the reaction-containing body is ignited, the tungsten filament is turned off, and a gas inlet on one side of the reaction chamber is opened to introduce 120 L/min-180 L/min nitrogen gas flow into the reaction chamber, and is closed after the pressure of nitrogen gas reaches about 2 atm. Then, a gas inlet on the bottom of the reaction chamber is opened to introduce 120 L/min-180 L/min nitrogen gas flow through the reaction-containing body, wherein the pressure of nitrogen gas is maintained at about 2 atm–4 atm. When the temperature of the reactant-containing body reaches about 2000° C., the temperature thereof does not rise any more. Meanwhile, the nitrogen gas flow rate is decreased when the pressure of the reaction chamber reaches about 5 atm; and the nitrogen gas flow rate is increased when the pressure of the reaction chamber is lowered to about 4.5 atm, thereby controlling the pressure within a predetermined range. Thereafter, the pressure of the reaction chamber is released to about 1 atm, and then nitrogen gas is introduced to the reaction chamber so as to raise the pressure thereof back to about 4.5 atm. Thereafter, the coolant continues re-circulating for 30 minutes, so as to lower the temperature of the reaction chamber.

The products are yellow; and in loosened and porous form. The weight of the products after reaction is about 1510 grams, and the conversion rate of aluminum to aluminum nitride is 99.8%, wherein O %=0.0477%, N %=34.0098%, C %=0.0771%, S %=0.0039%.

EXAMPLES 2–4

Different Ratios of Al:NaN$_3$ in Example 1

Examples 2–4 are similar to example 1, besides different weight ratios of aluminum powder to NaN$_3$ are applied thereto. The results of examples 2–4 are shown in Table 1.

TABLE 1

| Example | Al:AlN | Bulk Density (g/cm3) | Initial P (atm) | N$_2$ flow (l/min) | Conversion rate | O % | N % | Color | Product Superficial Pattern |
|---|---|---|---|---|---|---|---|---|---|
| 2 | 4:1 | 0.347 | 0.3 | 120–250 | 99.7 | 0.0498 | 34.002 | yellow | loosened and porous form |
| 3 | 6:1 | 0.339 | 0.5 | 120–250 | 99.8 | 0.0572 | 34.014 | yellow | loosened and porous form |
| 4 | 4:1 | 0.347 | 0.5 | 120–250 | 99.7 | 0.0512 | 34.089 | yellow | loosened and porous form |

EXAMPLE 5

The admixture of aluminum: aluminum nitride=4:1 is filled in the large graphite housing to form a reactant-containing body, and the total mass of the admixture is 30.3 kg with the bulk density of 0.341 g/cm$^3$. Then, the aforementioned (example 1) igniting agent of 3 mm in thickness and about 100 mm in diameter is placed on the center of the top of the reactant-containing body. After the reactant-containing body is ready, the reactant-containing body is placed a reaction chamber. Then, about 0.5 atm nitrogen gas is introduced into the reaction chamber, and the coolant (water) starts re-circulating between an inner wall and an outer wall of the reaction chamber, wherein the temperature of the coolant is kept at about room temperature. Thereafter, electric current of 30 to 40 Amperes and 50 to 60 Volts is applied to a tungsten filament (ignition device) for about 5 to 10 seconds. As soon as the igniting agent on the top of the reaction-containing body is ignited, the tungsten filament is turned off, and a gas inlet on one side of the reaction chamber is opened to introduce 450 L/min nitrogen gas flow into the reaction chamber, and is closed after the pressure of nitrogen gas reaches about 2 atm. Then, a gas inlet on the bottom of the reaction chamber is opened to introduce 450 L/min–650 L/min nitrogen gas flow through the reaction-containing body, wherein the pressure of nitrogen gas is maintained at about 2 atm–4 atm. When the temperature of the reactant-containing body reaches about 2000° C.–2200° C., the temperature thereof does not rise any more. Meanwhile, the nitrogen gas flow rate is decreased when the pressure of the reaction chamber reaches about 5 atm; and the nitrogen gas flow rate is increased when the pressure of the reaction chamber is lowered to about 4 atm, thereby controlling the pressure within a predetermined range. Thereafter, the pressure of the reaction chamber is released to about 1 atm, and then nitrogen gas is introduced to the reaction chamber so as to raise the pressure thereof back to about 4.5 atm. Thereafter, the coolant continues re-circulating for two hours so as to lower the temperature of the reaction chamber.

After reaction, the products on the top and the perimeter of the reactant-containing body are white-gray; and in loosened form. The products in the central area are yellow; and in loosened and porous form with whiskers. The conversion rate of aluminum to aluminum nitride is 99.7%, wherein O %=0.0721%, N %=33.89%, C %=0.0212%, S %=0.0034%.

EXAMPLE 6

The medium graphite housing is divided into an upper layer and a lower layer based on the height thereof, wherein the admixture of aluminum: aluminum nitride=2:1 is filled in the lower layer, and the admixture of aluminum: aluminum nitride=4:1 is filled in the upper layer. Then, the aforementioned (example 1) igniting agent of 3 mm in thickness and about 70 mm in diameter is placed on the center of the top of the reactant-containing body The subsequent steps of example 6 are similar to those of example 5. After reaction, the products on the perimeter of the reactant-containing body are white-gray; and in loosened form. The products in the central area are yellow; and in loosened and porous form with whiskers. The conversion rate of aluminum to aluminum nitride is 99.7%, wherein O %=0.0568%, N %=33.921%, C %=0.0310%, S %=0.0022%.

EXAMPLE 7

Various Ratios of Al:AlN Filled in the Hollow Housing

Besides using different ratios of Al:AlN, Example 7 is similar to example 5. Such as shown in FIG. 2A and FIG. 2B, in the large graphite hollow housing (reactant-containing body 60), an aluminum plate of 65 cm long, 30 cm wide and 0.5 mm thick is used to form a first cylinder of 20 cm in diameter; another aluminum plate of 128 cm long, 30 cm wide and 0.5 mm thick is used to form a cylinder of 40 cm in diameter; and another aluminum plate of 160 cm long, 30 cm wide and 0.5 mm thick is used to form a second cylinder of 50 cm in diameter. From the inner to the outer, the admixture (2.8 kg; 0.318 g/cm$^3$) of aluminum: aluminum nitride=8:1 is filled in the first division 65 (the most inner part); the admixture (8.9 kg; 0.328 g/cm$^3$) of aluminum: aluminum nitride=6:1 is filled in the second division 66; and the admixture (18.9 kg; 0.336 g/cm$^3$) of aluminum: aluminum nitride=3:1 is filled in the third division 67. After the admixtures are completely filled in the reactant-containing body, the first and second cylinders are removed. Then, the aforementioned (example 1) igniting agent of 3 mm in thickness and about 100 mm in diameter is placed on the center of the top of the reactant-containing body The subsequent steps of example 7 are similar to those of example 5. After reaction, the products on the top and the perimeter of the reactant-containing body are white-gray;

and in loosened form. The products in the central area are yellow; and in loosened and porous form with whiskers. The conversion rate of aluminum to aluminum nitride is 99.8%, wherein O %=0.0523%, N %=33.91%, C %=0.0211%, S %=0.0022%.

It is worthy to be noted that: if example 7 uses pure aluminum powder as an igniting agent and ignites it under the nitrogen gas pressure less than 3 atm, it takes about 2 minutes for ignition. The ignition time is too long, not only consuming a lot of electric powder, but also greatly reducing the usage life of the tungsten filament due to too much flame after ignition.

Therefore, it can be known from the above preferred embodiments that the present invention has the advantages of brief operation steps; lower operation cost; easy ignition; no oxygen and moisture contamination from atmosphere; prevention of aluminum nitride from reacting with the moisture remained in the reaction chamber during cooling process; and prevention of agglomeration of aluminum nitride produced.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structures.

What is claimed is:

1. A method for synthesizing aluminum nitride, said method comprising:
    preparing a reactant-containing body, wherein said reactant-containing body comprises a first aluminum powder;
    preparing an igniting agent, said igniting agent comprising an azide powder;
    placing said igniting agent on an ignition zone which is located on top of one end of said reactant-containing body, wherein said azide powder is excluded in other zones of said reactant-containing body;
    placing said reactant-containing body in a reaction chamber;
    vacuuming said reaction chamber;
    introducing nitrogen gas into said reaction chamber, thereby increasing the pressure in said reaction chamber to a first predetermined pressure;
    igniting said igniting agent in said ignition zone; and
    further introducing nitrogen gas into said reaction chamber after ignition, so as to increase the pressure in said reaction chamber to a second predetermined pressure for performing a combustion synthesis process to produce said aluminum nitride, wherein said second predetermined preasure is greater than said first predetermined pressure.

2. The method for synthesizing aluminum nitride according to claim 1, wherein said first predetermined pressure is between 0.3 atm and 0.75 atm, and said second predetermined pressure is between 0.75 atm and 10 atm.

3. The method for synthesizing aluminum nitride according to claim 1, wherein the pressure of said reaction chamber is first released essentially to 1 atm after said combustion synthesis process is done, and then nitrogen gas is introduced to increase the pressure of said reaction chamber to a third predetermined pressure, and thereafter a cooling process is performed.

4. The method for synthesizing aluminum nitride according to claim 3, wherein said third predetermined pressure is between 3 atm and 10 atm.

5. The method for synthesizing aluminum nitride according to claim 1, wherein said reactant-containing body further comprises:
    a diluent, wherein said diluent is first mixed with said first aluminum powder to form an admixture, and then said admixture is filled in said reactant-containing body.

6. The method for synthesizing aluminum nitride according to claim 5, wherein said diluent is selected from the group consisting of AlN, $Al_2O_3$, BN, $Si_3N_4$, TiN, SiC, $ZrO_2$, $TiO_2$, $SiO_2$ and any mixture thereof.

7. The method for synthesizing aluminum nitride according to claim 5, wherein the content of said diluent is gradually increasing along the propagation direction of the combustion wave occurring in said combustion synthesis process.

8. The method for synthesizing aluminum nitride according to claim 1, wherein said ignition zone is located on the topmost end of said reactant-containing body.

9. The method for synthesizing aluminum nitride according to claim 1, wherein said azide powder is selected from a group consisting of sodium nitride ($NaN_3$) powder, potassium nitride ($KN_3$), barium nitride ($Ba_3\ N_2$) and any mixture thereof.

10. The method for synthesizing aluminum nitride according to claim 1, wherein said igniting agent further comprises a second aluminum powder.

11. The method for synthesizing aluminum nitride according to claim 10, the specification of said second aluminum powder is different from the specification of said first aluminum powder, and the bulk density of said second aluminum powder is essentially ranged between 0.3 $g/cm^3$ and 0.5 $g/cm^3$, and less than 8% of said second aluminum powder is 150 mesh of particle size.

12. The method for synthesizing aluminum nitride according to claim 1, wherein the composition of said azide powder in said igniting agent is greater than or equal to 0.3% wt.

13. A method for synthesizing aluminum nitride, said method comprising:
    preparing a reactant-containing body, wherein said reactant-containing body comprises a first aluminum powder and a diluent mixed with said first aluminum powder;
    preparing an igniting agent, said igniting agent comprising an azide powder and a second aluminum powder mixed with said azide powder, wherein said azide powder is sodium nitride ($NaN_3$);
    placing said igniting agent on an ignition zone which is located on top of one end of said reactant-containing body, wherein said azide powder is excluded in other zones of said reactant-containing body;
    placing said reactant-containing body in a reaction chamber;
    vacuuming said reaction chamber;
    introducing nitrogen gas into said reaction chamber, thereby increasing the pressure in said reaction chamber to a first predetermined pressure;
    igniting said igniting agent in said ignition zone; and
    further introducing nitrogen gas into said reaction chamber after ignition, so as to increase the pressure in said reaction chamber to a second predetermined pressure for performing a combustion synthesis process to produce said aluminum nitride, and the content of said diluent is gradually increasing along the propagation direction of the combustion wave occurring in said combustion synthesis process, wherein said second predetermined pressure is greater than said first predetermined pressure.

14. The method for synthesizing aluminum nitride according to claim 13, wherein said first predetermined pressure is between 0.3 atm and 0.75 atm.

15. The method for synthesizing aluminum nitride according to claim 13, wherein said second predetermined pressure is between 0.75 atm and 10 atm.

16. The method for synthesizing aluminum nitride according to claim 13, wherein the pressure of said reaction chamber is first released to 1 atm after said combustion synthesis process is done, and then nitrogen gas is introduced to increase the pressure of said reaction chamber to a third predetermined pressure, and thereafter a cooling process is performed.

17. The method for synthesizing aluminum nitride according to claim 16, wherein said third predetermined pressure is between 3 atm and 10 atm.

18. The method for synthesizing aluminum nitride according to claim 13, wherein said diluent is selected from the group consisting of AlN, $Al_2O_3$, BN, $Si_3N_4$, TiN, SiC, $ZrO_2$, $TiO_2$, $SiO_2$ and any mixture thereof.

19. The method for synthesizing aluminum nitride according to claim 13, the specification of said second aluminum powder is different from the specification of said first aluminum powder, and the bulk density of said second aluminum powder is between 0.3 $g/cm^3$ and 0.5 $g/cm^3$, and less than 8% of said second aluminum powder is 150 mesh of particle size.

20. The method for synthesizing aluminum nitride according to claim 13, wherein the composition of said azide powder in said igniting agent is greater than or equal to 0.3% wt.

* * * * *